(12) United States Patent
Sander (10) Patent No.: US 9,373,951 B2
(45) Date of Patent: Jun. 21, 2016

(54) SWITCH MODE CURRENT LIMITER

(75) Inventor: Sverker Sander, Billdal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 75 days.

(21) Appl. No.: 14/009,326

(22) PCT Filed: Apr. 1, 2011

(86) PCT No.: PCT/EP2011/055116
§ 371 (c)(1),
(2), (4) Date: Oct. 1, 2013

(87) PCT Pub. No.: WO2012/130328
PCT Pub. Date: Oct. 4, 2012

(65) Prior Publication Data
US 2014/0321021 A1 Oct. 30, 2014

(51) Int. Cl.
  *H02H 3/087* (2006.01)
  *H02H 9/00* (2006.01)
  *H02H 9/08* (2006.01)
(52) U.S. Cl.
  CPC .............. *H02H 3/087* (2013.01); *H02H 9/002* (2013.01); *H02H 9/08* (2013.01)
(58) Field of Classification Search
  CPC ......... H02H 3/087; H02H 3/08; H02H 7/265; H02H 9/02–9/028
  USPC ................................................ 361/93.1, 93.9
  See application file for complete search history.

(56) References Cited

U.S. PATENT DOCUMENTS

| 5,089,927 A | 2/1992 | Bulan et al. |
| 5,400,206 A | 3/1995 | Barnes et al. |
| 5,452,170 A * | 9/1995 | Ohde et al. ...................... 361/13 |
| 2006/0120000 A1 * | 6/2006 | Fiesoli et al. ................ 361/93.1 |
| 2006/0132998 A1 * | 6/2006 | Agari ............................ 361/93.1 |
| 2008/0197808 A1 * | 8/2008 | Banta et al. ................... 320/134 |
| 2009/0296290 A1 | 12/2009 | Hsu et al. |
| 2010/0301496 A1 * | 12/2010 | Koduri .......................... 257/777 |

FOREIGN PATENT DOCUMENTS

WO 2010074617 A1 7/2010

OTHER PUBLICATIONS

"Electric current". Wikipedia. <https://en.wikipedia.org/wiki/Electric_current>. Accessed Sep. 23, 2015.*

* cited by examiner

*Primary Examiner* — Stephen W Jackson
*Assistant Examiner* — Christopher Clark
(74) *Attorney, Agent, or Firm* — Patent Portfolio Builders, PLLC (57) ABSTRACT

A current limiter (100, 200, 400, 500, 700) comprises a switch (110) and connection means (105, 125) to a load and to a DC-voltage source. A control component (115) measures the current from a load to a DC-voltage source to the switch and controls the switch (110) to an open position if the current is above a threshold. In the closed position, the switch (110) admits current from the load to the DC-voltage source. The current limiter also comprises a transmission line (120) with a first (121) and a second (122) end. The first end (121) is connected to the input port of the switch (110), and the second end (122) is left open or connected to make the transmission line (120) connected in series with the switch (110).

14 Claims, 11 Drawing Sheets

FIG. 7

SWITCH MODE CURRENT LIMITER

CROSS REFERENCE TO RELATED APPLICATION(S)

This application is a 35 U.S.C. §371 National Phase Entry Application from PCT/EP2011/055116, filed Apr. 1, 2011, designating the United States, the disclosure of which is incorporated herein in its entirety by reference.

TECHNICAL FIELD

The present invention discloses an improved switch mode current limiter.

BACKGROUND

A conventional switch mode current limiter usually comprises, as the name implies, a switch that limits a current. The current to the switch is measured, and if the current exceeds a certain threshold value, the switch is opened, thereby interrupting the current and stopping it from propagating beyond the switch.

According to prior art, if the switch is opened, the current is diverted to another circuit, usually a diode, a so called "free wheel diode", in order to maintain a path for the current, which otherwise might have caused damage.

This is a problem in particular when the current limiter is connected to a circuit or a load with inductive components.

A conventional switch mode current limiter is usually connected between a DC-voltage source and a load.

The free wheel diode which is used in conventional switch mode current limiters is quite expensive, and only has a limited ability to handle the diverted free wheel current, for example if the diverted current is in the form of a brief but intense current pulse.

SUMMARY

It is an object of the invention to overcome at least some of the disadvantages of conventional switch mode current limiters.

This object is addressed by the invention in that it discloses a current limiter which comprises first connection means to a load and second connection means to a DC-voltage source. In addition, the current limiter also comprises a switch with an input port and an output port, where the switch is arranged so that current from the load to the DC-voltage source passes through the switch.

The current limiter further comprises a control component which is arranged to measure the current from a connected load to a connected DC-voltage source and to control the switch to assume an open or a closed position. In the closed position, the switch will admit current from the load to the DC-voltage source. The control component is arranged to control the switch to assume the open position if the current from the load is above a first threshold value.

The current limiter also comprises a transmission line with a first and a second end, where the first end is connected to the input port of the switch and said second end is either left open or connected to make the transmission line connected in series with the switch.

The transmission line will thus handle currents which are diverted into it when the switch is in the open position, and as opposed to a free wheel diode, the transmission line can be designed to handle more or less arbitrary current strengths. In addition, a transmission line is a low cost component, which for example can be manufactured in or on an existing PCB on which the rest of the current limiter is also arranged.

In embodiments, the control component is arranged to control the switch to assume the closed position if the current is below a second threshold value.

In embodiments, the control component is arranged to control the switch to assume the closed position after a certain period of time in the open position.

In embodiments, the switch is controlled to the closed position by a manual reset signal.

In embodiments, the current limiter additionally comprises a capacitor connected in parallel to the first connection means.

In embodiments, the current limiter additionally comprises an inductor in series with the switch, arranged between the transmission line and the first connection means.

In embodiments of the current limiter, the switch comprises a transistor.

In embodiments of the current limiter, the switch comprises a micro-electromechanical system (MEMS) switch.

In embodiments of the current limiter, the switch comprises a relay.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

Figure 1:
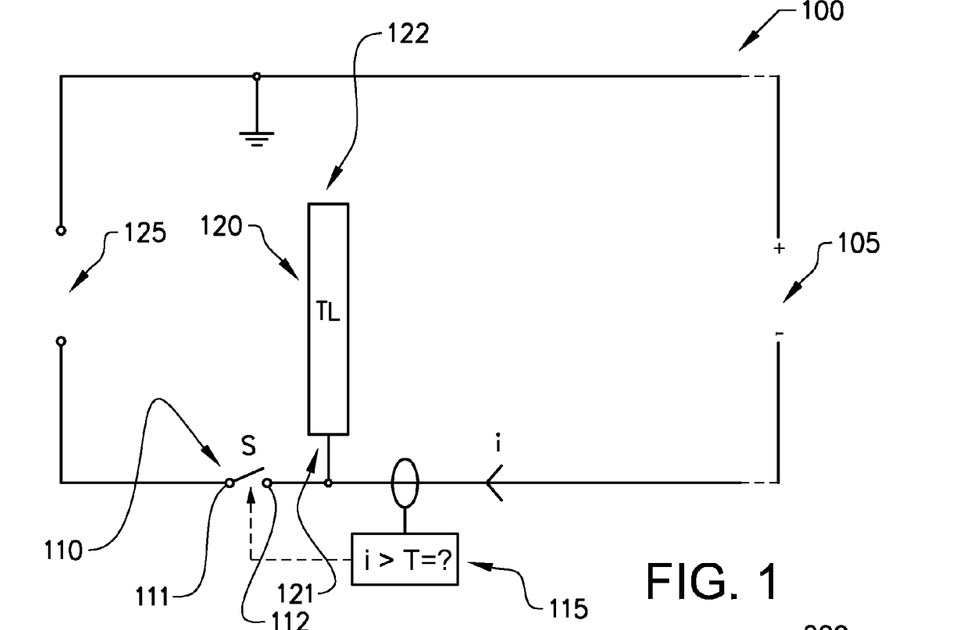
FIG. 1 shows a first embodiment of a current limiter.

FIG. 1 shows a basic version of a first embodiment 100 of a current limiter of the invention. The current limiter 100 comprises first connection means 105 to a load and second connection means 125 to a DC voltage source. When a load and a DC voltage source, respectively, are connected to the current limiter 100, then, as indicated by means of an arrow and the letter "i" in FIG. 1, a current i will pass from the load to the DC-voltage source. (To be more specific, the current i will "return" from the load to the DC-voltage source.). In order to protect the DC voltage source from excessively strong currents, the current limiter 100 also comprises a switch 110 and a control component 115. The control component is arranged to measure the current i, and to control the switch 110 depending on the amplitude of the current. The switch has an input port 112 and an output port 111.

The switch 110 is controlled to an "open" position by the control component 115 if the current i is above a certain first value, i.e. a first threshold indicated as "T" in FIG. 1, and to a closed position if the current i is below another, second threshold, which may be the same as the first threshold T or different from it. In an alternative embodiment, the control component 115 is arranged to control the switch 110 to the closed position again after a certain period of time. In a further embodiment, the switch 110 is controlled to the closed position by a manual reset signal, which can be seen as an emulation of a fuse function.

If the switch is controlled to the open position, the current i will not be able to reach the DC voltage source 125, and must therefore be diverted somewhere else. To this end, the current limiter comprises a transmission line 120. As can be seen, the transmission line 120 comprises a first end 121 and a second end 122, of which the first end 121 is connected to the input port 112 of the switch 110. The other end of the transmission line 120, i.e. the second end 122, is left "open", i.e. unconnected.

As can be seen in FIG. 1, when the switch 110 is in the "closed" position, a DC current can flow through the switch 110. The DC impedance of transmission line 120 is more or less infinitely high since the transmission line's second end 122 is left "open", i.e. unconnected. However, if the control component 115 measures the current and finds it to be equal to or above the threshold, the control component 125 will open the switch 110. In such a case, i.e. if the switch 110 is opened, the characteristic impedance of the transmission line's input end 121 for the current i will be smaller than that of the switch 110, which is more or less infinite in the "open" position. Hence, with the switch 110 in the "open" position, the current i will be diverted into the transmission line 120.

Figure 2:
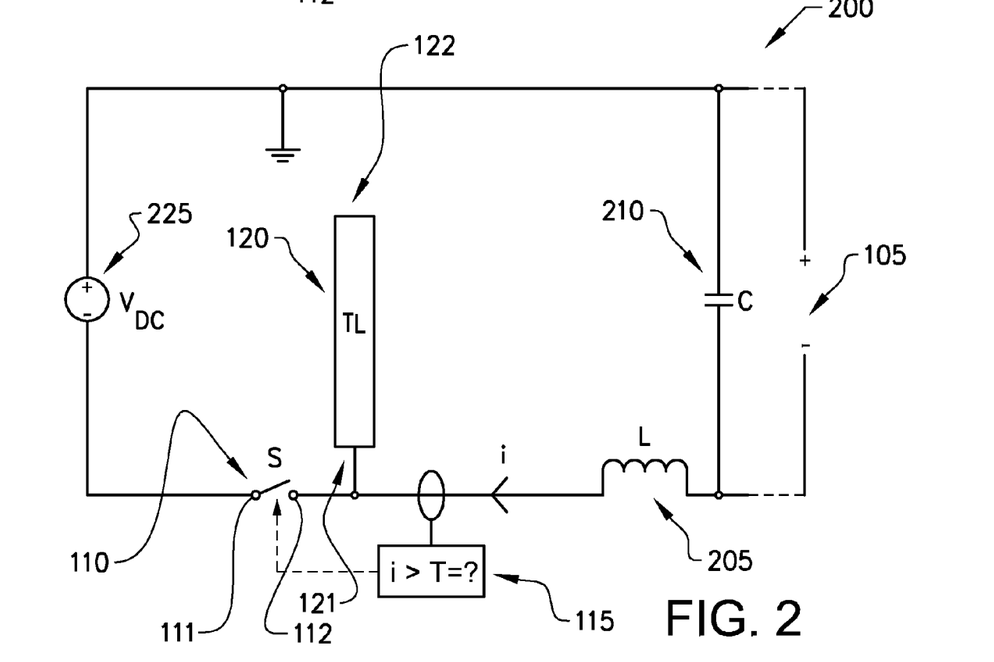
FIG. 2 shows another version of the embodiment of FIG. 1, and FIGS. 3*a*-3*d* show comparisons between the embodiment of FIG. 2 and prior art.

FIG. 2 shows a further embodiment 200 of a current limiter. In FIG. 2, a DC voltage source 225 is shown as being connected to the second connection means. The embodiment 200 includes an inductor 205 connected in series with the switch 110, arranged between the transmission line 120 and the first connection means 105, i.e. the connection means to a load which is not shown in FIG. 2. The embodiment 200 also comprises a capacitor 210 connected in parallel to the first connection means. The capacitor 210 and the inductor 205 together constitute a low pass filter to attenuate disturbances generated by, for example, power converters connected to the connection means 105, or in the other direction, to reject disturbances originated from a DC voltage connected at the connection means 225.

When the switch 110 is controlled to the "open" position due to a high current from a load, the inductor 205 will force the current i to continue to flow in the current limiter 200 circuit directly after switch 110 is opened. This current will now find a (relatively) low impedance path in the impedance $Z_0$ of the transmission line 120.

After a time equal to the propagation time delay of transmission line 120, the current i is totally reflected in the second end 122 of the transmission line 120, and will then propagate back to the switch 110, where the voltage makes a second step change. The current i is then reflected back and forth, until the energy is dissipated in the current limiter's resistive components, i.e. in the embodiment 200 the inductor 205, the capacitor 210 and the transmission line 120.

Figure 3A:
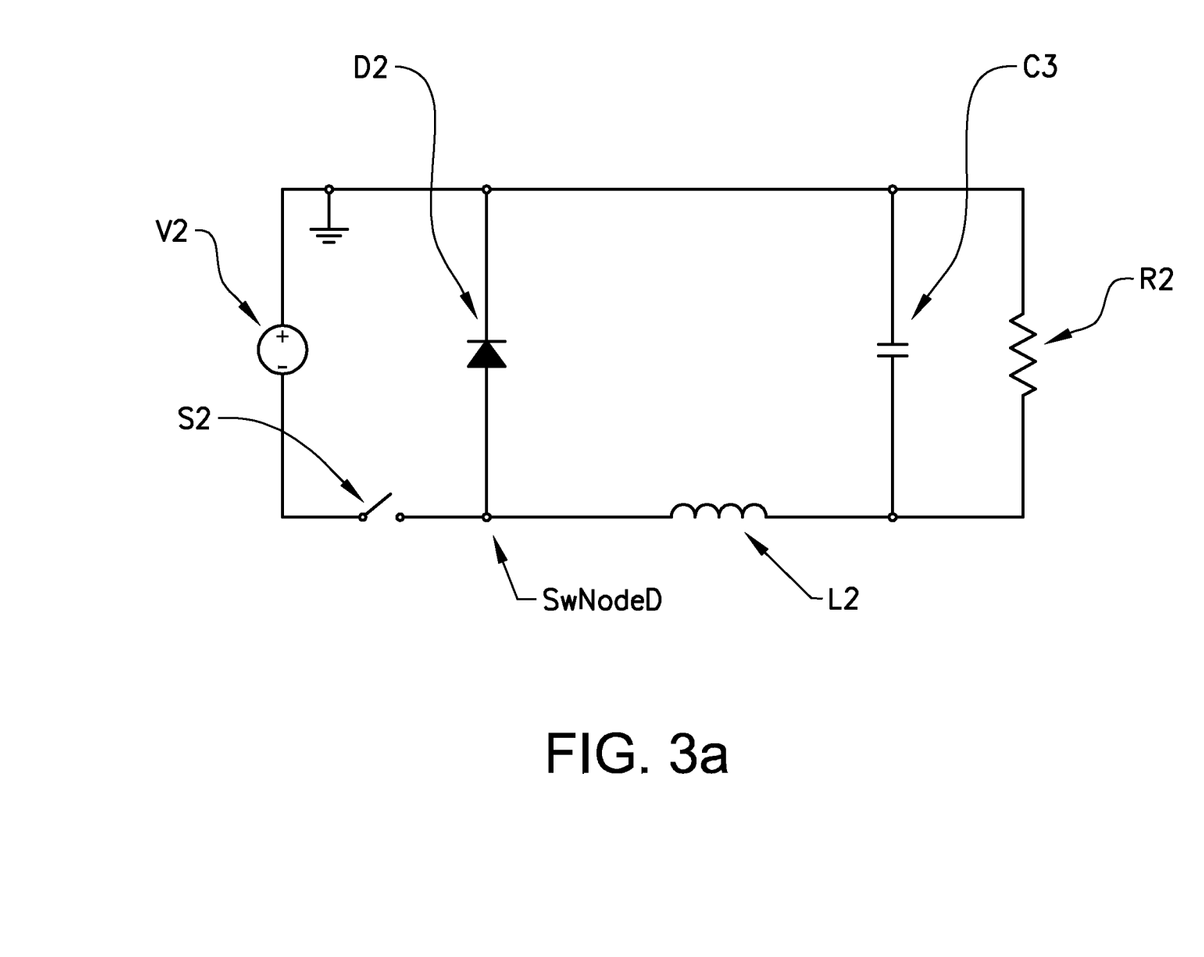
Figure 3B:
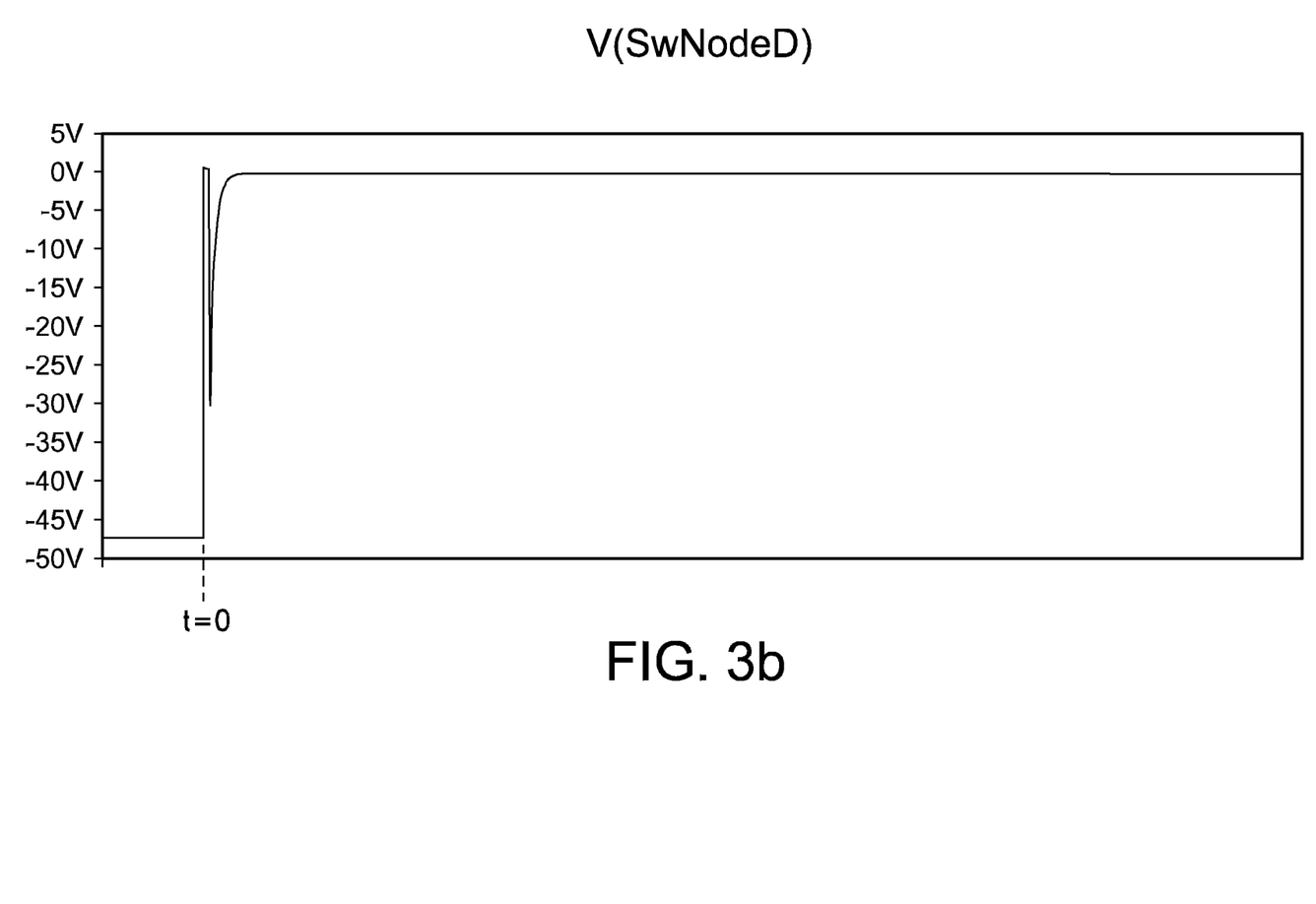
Figure 3C:
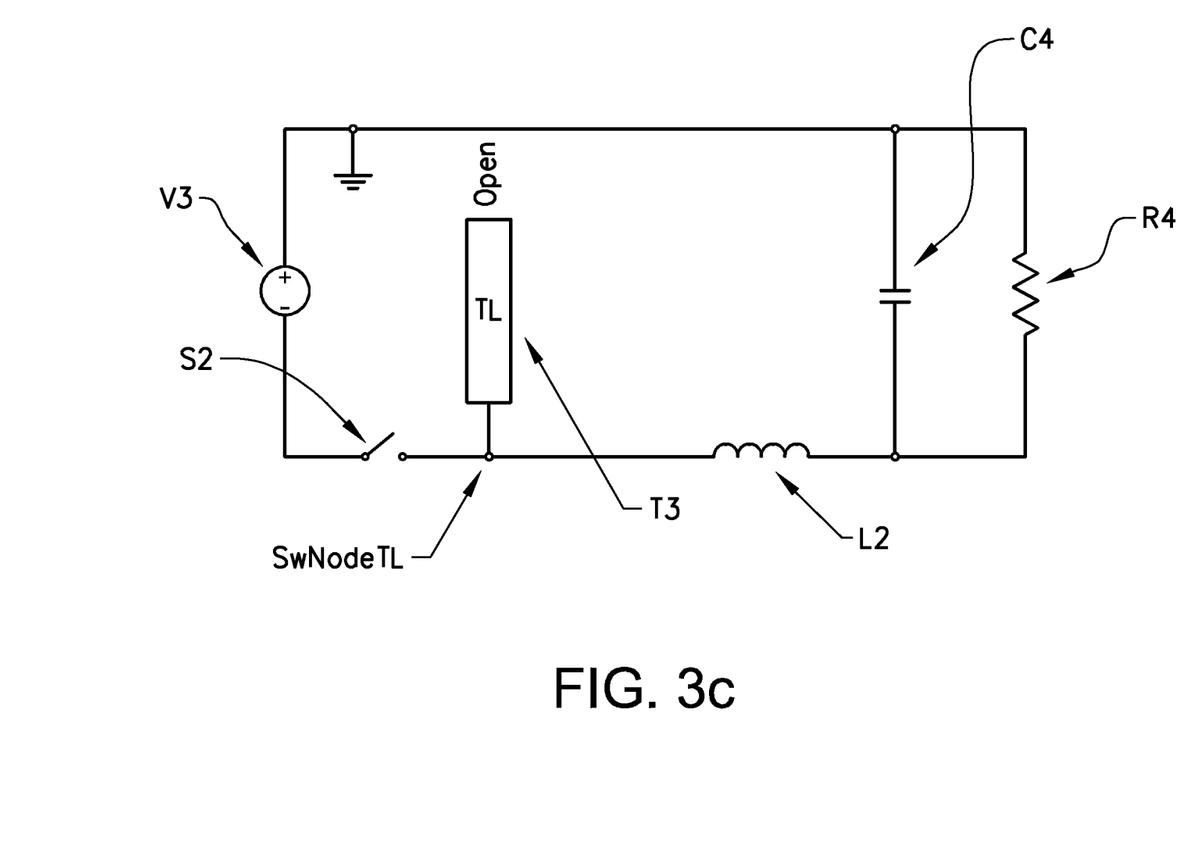
Figure 3D:
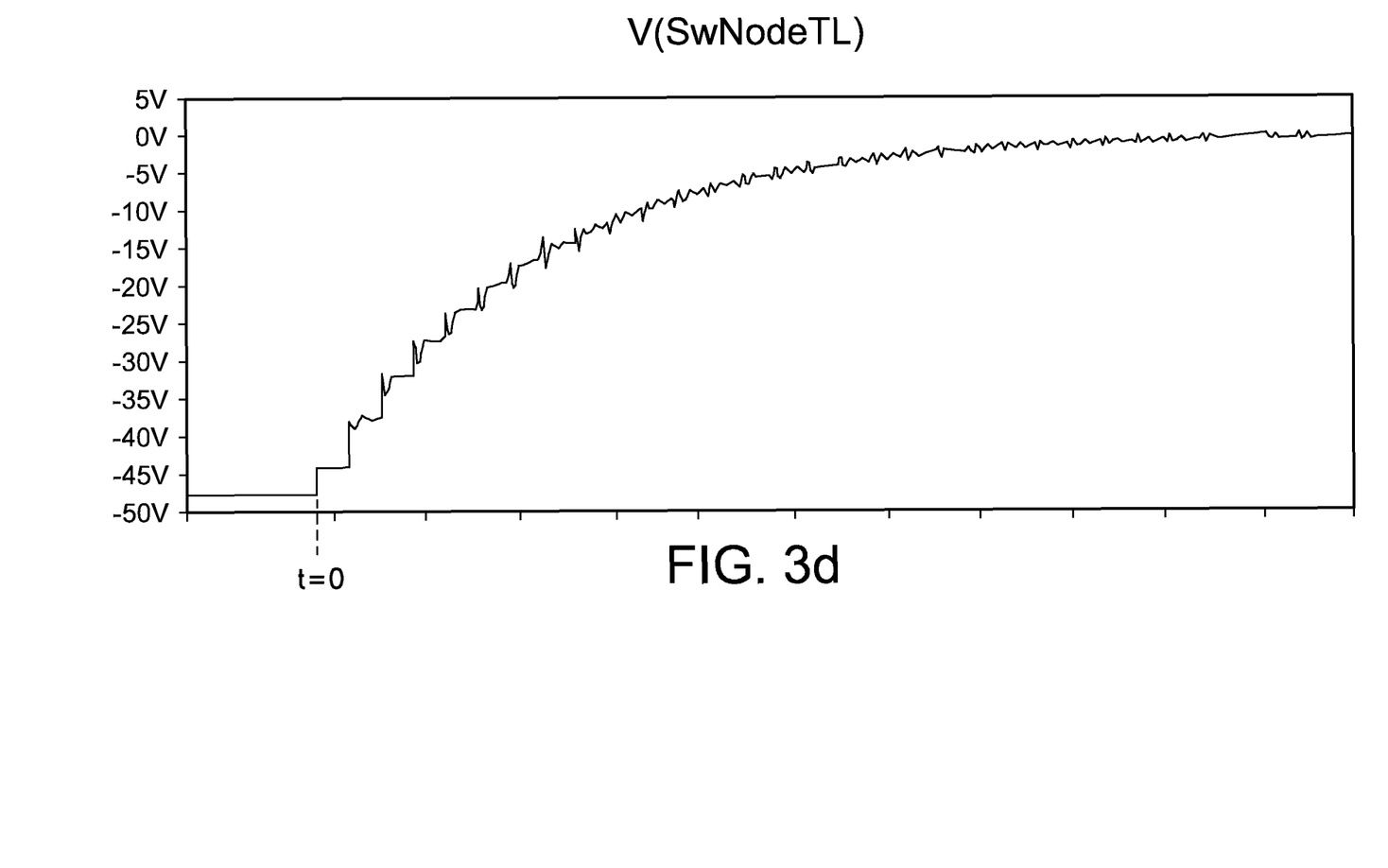

FIGS. 3a-3d show a comparison between the performance of a traditional current limiter with a free wheel diode and a current limiter similar to the one 200 of FIG. 2. FIGS. 3a and 3c show said current limiters, and FIGS. 3b and 3d show a diagram of the voltage at a position indicated as SwNodeD in FIG. 3a and as SwNodeTL in FIG. 3c, before and after the switch has been moved from the "closed" to the "open" position at t=0. The positions SwNodeD and SwNodeTL are in essence the input port 112 to the switch 110 of FIGS. 1 and 2.

The control component 115 shown in FIGS. 1 and 2 is not explicitly shown in FIGS. 3a and 3c.

FIG. 3b shows the performance of the traditional current limiter of FIG. 3a having switch S2 closed until a point in time indicated as t=0. The free wheel diode D2 will supply a path for the "free wheel current", and will thus limit the positive switch voltage to the diode's forward voltage drop. This can be observed as a short pulse of about 0 V in FIG. 3b, directly following the opening of switch S2.

Turning now to FIG. 3c, we see a current limiter which corresponds to the embodiment 200 of FIG. 2. The free wheel diode D2 of FIG. 3a is thus replaced with a transmission line, TL, which has one end connected to the switch, while the other end of the transmission line TL is left open. The transmission line TL will consequently have very high DC impedance (in the order of MΩ).

The TL's characteristic impedance, $Z_0$, will be dominant when the switch (shown as S2 in FIG. 3c) is opened, which occurs rapidly, suitably with an opening time which is equal to or smaller than the propagation delay of TL. The inductor L2 (corresponding to inductor 205 in FIG. 2) will force a current to continue to flow in the circuit directly after the switch S2 is opened, and this current will now find a low impedance path in $Z_0$, i.e. in the transmission line TL, corresponding to transmission 120 in FIG. 2.

The initial switch node voltage SwNodeTL will be determined by the DC voltage accumulated in the TL, due to its capacitive qualities, prior to the opening of the switch. The "free wheel current" described in connection with FIGS. 3a and 3b will in this embodiment propagate as a current wave into the transmission line TL, thus adding a "voltage step" to the switch node voltage SwNodeTL, as shown in FIG. 3d at t=0.

The current wave is totally reflected in the unconnected end of the transmission line TL, and propagates back to the switch, where the voltage makes a second step change. The current wave is reflected back and forth until the energy is dissipated in the current limiter's resistive parts, i.e. T3, L2, C4, R4, which all comprise a resistive component.

Figure 4:
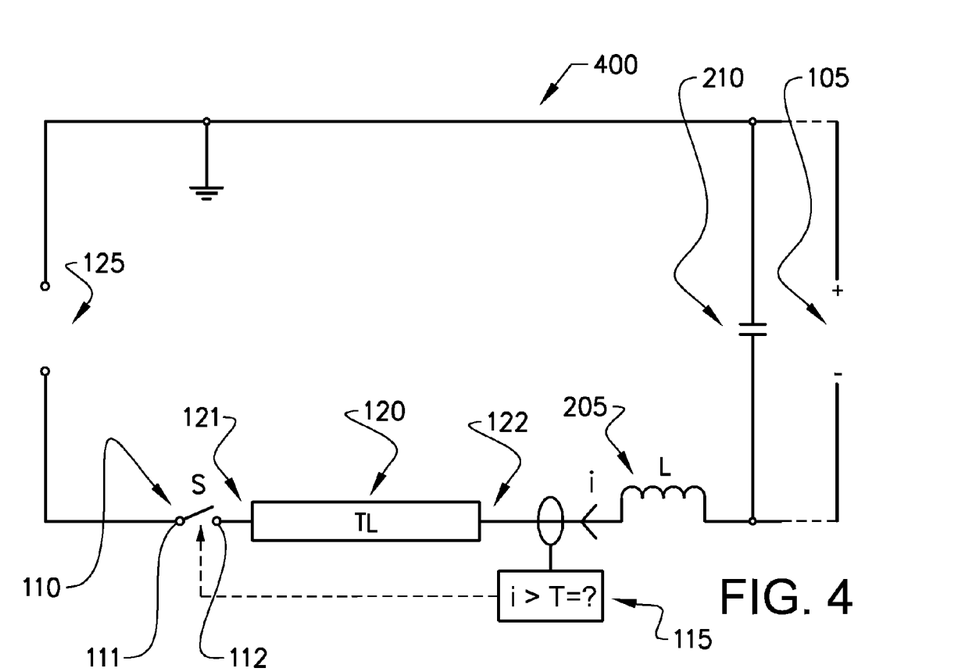
FIG. 4 shows a second embodiment of a current limiter.

FIG. 4 shows another embodiment 400 of a current limiter of the invention. Parts or components which the current limiter 400 has in common with the embodiments of FIG. 1 and/or FIG. 2 have retained their reference numbers and will not be described in detail again here.

As can be seen in FIG. 4, the current limiter 400 comprises a transmission line 120, with a first end 121 connected to the input port of the switch 110. However, as opposed to the embodiments of FIGS. 1 and 2, in the current limiter 400 a second end 122 of the transmission line 120 is connected so that the transmission line is connected in series with the switch 110, in FIG. 4 in such a manner that the second end 122 of the transmission line 120 is connected to the inductor 205 of the low pass LC filter formed by the inductor 205 and the capacitor 210.

Figure 5:
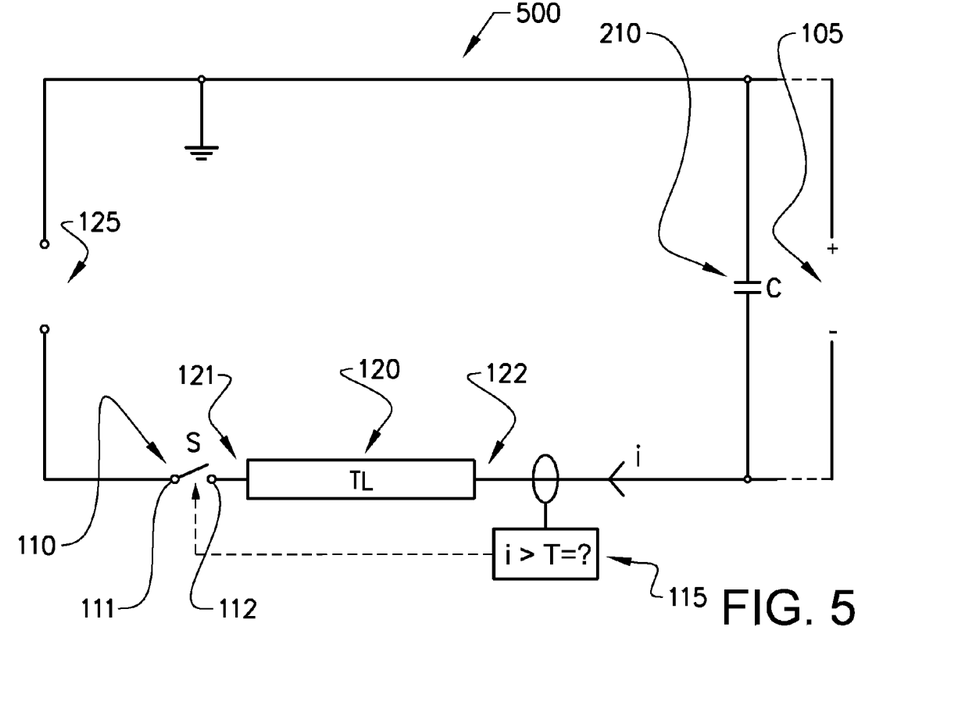
FIG. 5 shows another version of the embodiment of FIG. 4, and FIGS. 6*a*-6*d* show comparisons between the embodiment of FIG. 5 and prior art.

FIG. 5 shows a second version 500 of the embodiment from FIG. 4, i.e. a current limiter in which the transmission line 120 is connected in series with the switch 110. In the embodiment 500, the current limiter also comprises the capacitor 210, i.e. a capacitor connected in parallel with the second connection means 210, so that the capacitor will be connected in parallel to a load which is connected to second the connection means 105. The inductor 205 is not comprised in the embodiment 500, since the transmission line 120 as such exhibits inductive qualities particularly at low frequencies, so that there is an inductor comprised in the transmission line 120, which is thus in series with the switch 110. The transmission line 120 consequently replaces two components, compared to a conventional switch mode current limiter, by performing the diode's function as well as an inductor's function.

Figure 6A:
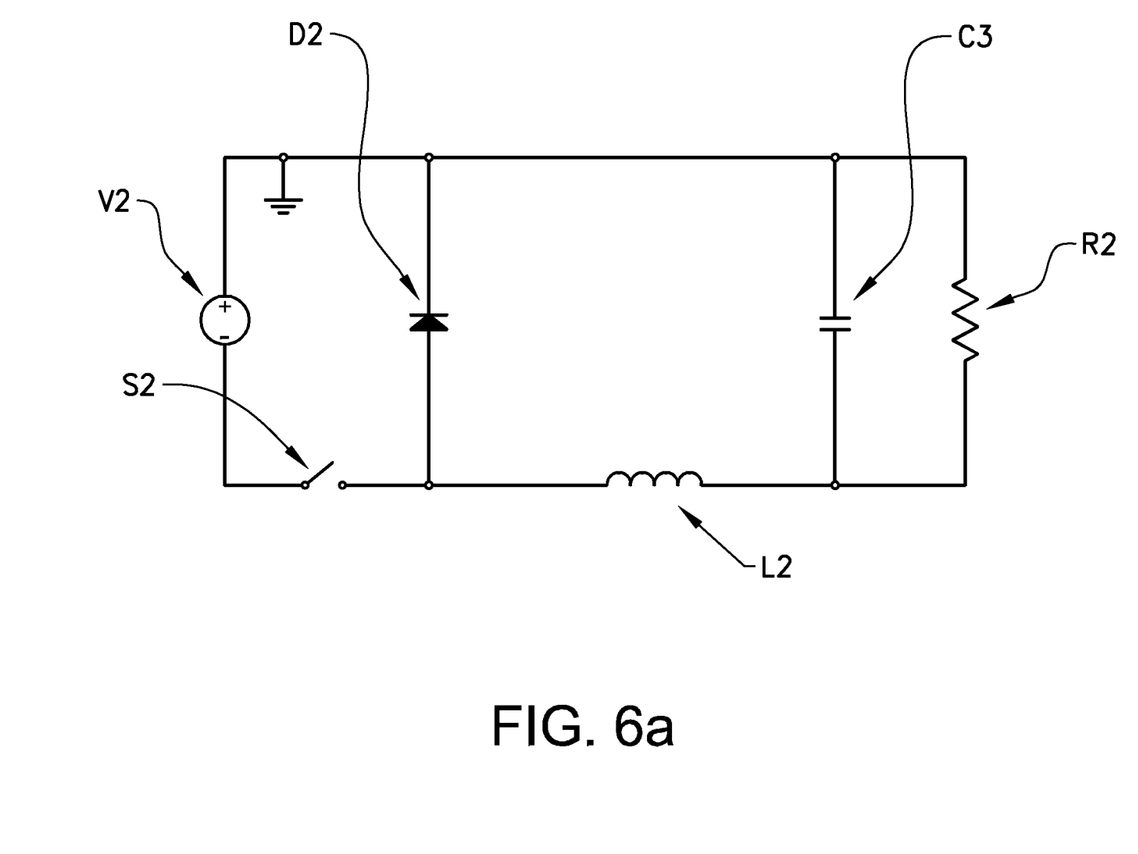
Figure 6B:
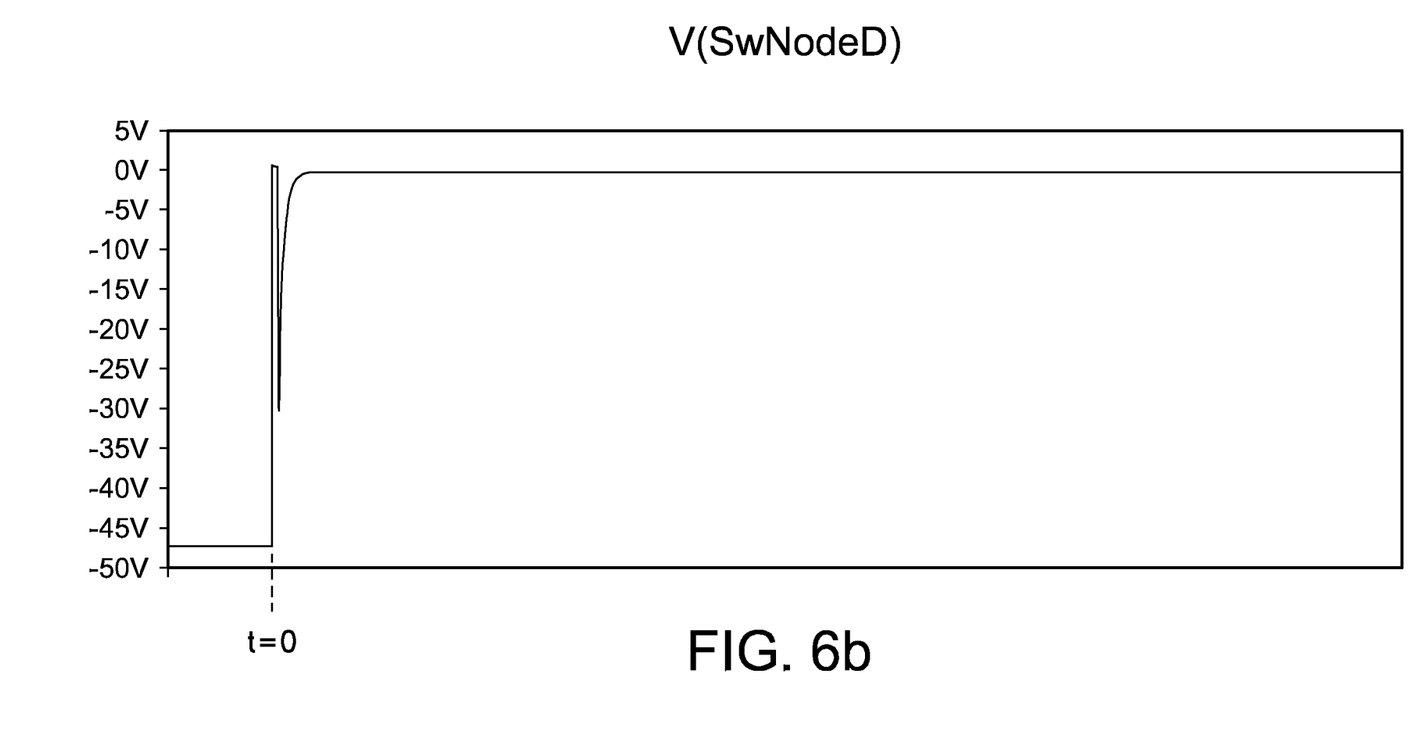
Figure 6C:
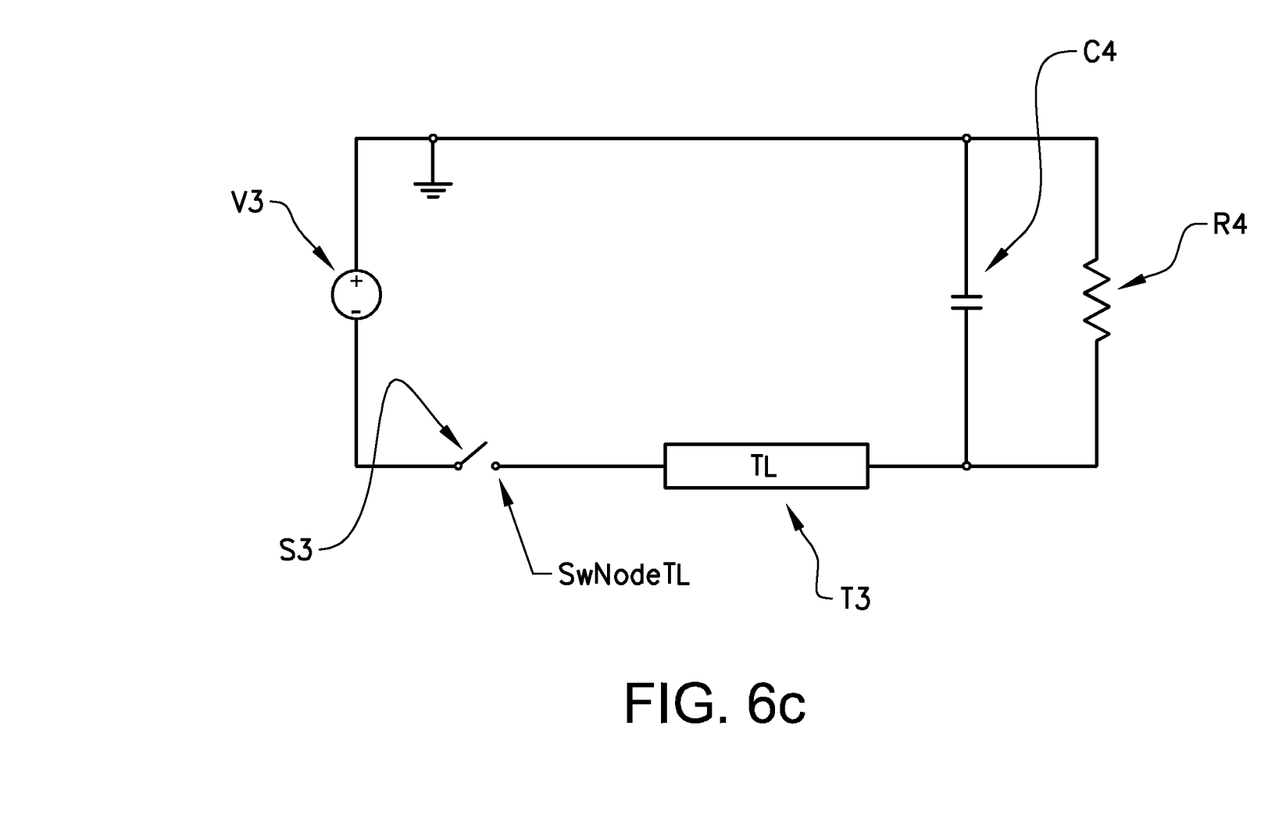
Figure 6D:
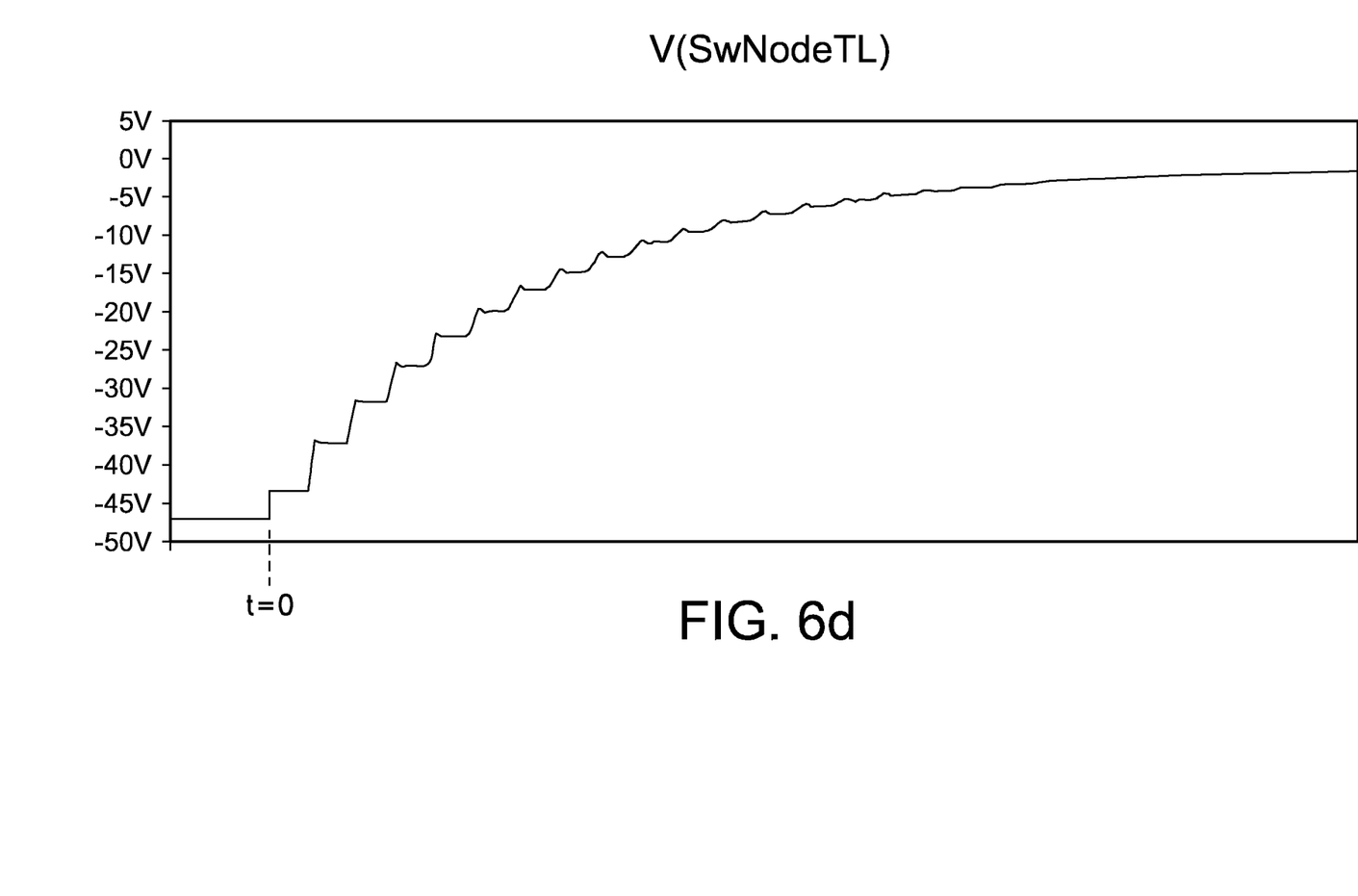

FIGS. 6c and 6d show the performance of the embodiment 500 of FIG. 5, as compared to a conventional current limiter with a free wheel diode, which is shown in FIGS. 6a and 6b.

The current limiter of FIG. 6c corresponds to the embodiment 500 of FIG. 5. In addition, a load is shown as connected to the first connection means, where the load is indicated as R4 in FIG. 6c (and as R2 in FIG. 6a). The control component 115 is not shown in FIG. 6c.

FIG. 6b shows the performance of a conventional current limiter which was also shown in FIG. 3b. For that reason, the performance shown in FIG. 6a will not be described here again.

Turning now to FIG. 6d, we see the voltage at the switch node SwNodeTL, corresponding to the switch input 112 of the switch 110 in the current limiter 500 from FIG. 5, before and after the switch 110 is opened at a point in time t=0. The voltage with the switch 110 in the closed position is constant, i.e. equal to the DC input voltage, and then increases "stepwise" when the switch 110 is opened.

Thus, parts of the transmission line TL in FIG. 6c can be regarded as an inductor, one of whose functions is to filter signals from the load R4 together with capacitor C4, which corresponds to the capacitor 210.

The transmission line TL's characteristic impedance $Z_0$ will supply a low impedance when the switch S3 (corresponding to the switch 110 in FIG. 5) is opened. After the switch 110 is opened, the transmission line won't carry a DC current, but rather a current wave.

The initial (i.e. prior to the opening of the switch) voltage at the switch node, i.e. at the switch S3, is determined by the DC voltage which has been accumulated in the transmission line's capacitive elements prior to the opening of the switch.

The free wheel current wave created when switch S3 is opened, will add a voltage step to the switch node voltage, as indicated in FIG. 6d. This current wave is reflected back and forth until its energy is dissipated in the resistive parts of the current limiter's component, i.e. T3, C4 and R4 in FIG. 6c.

Figure 7:
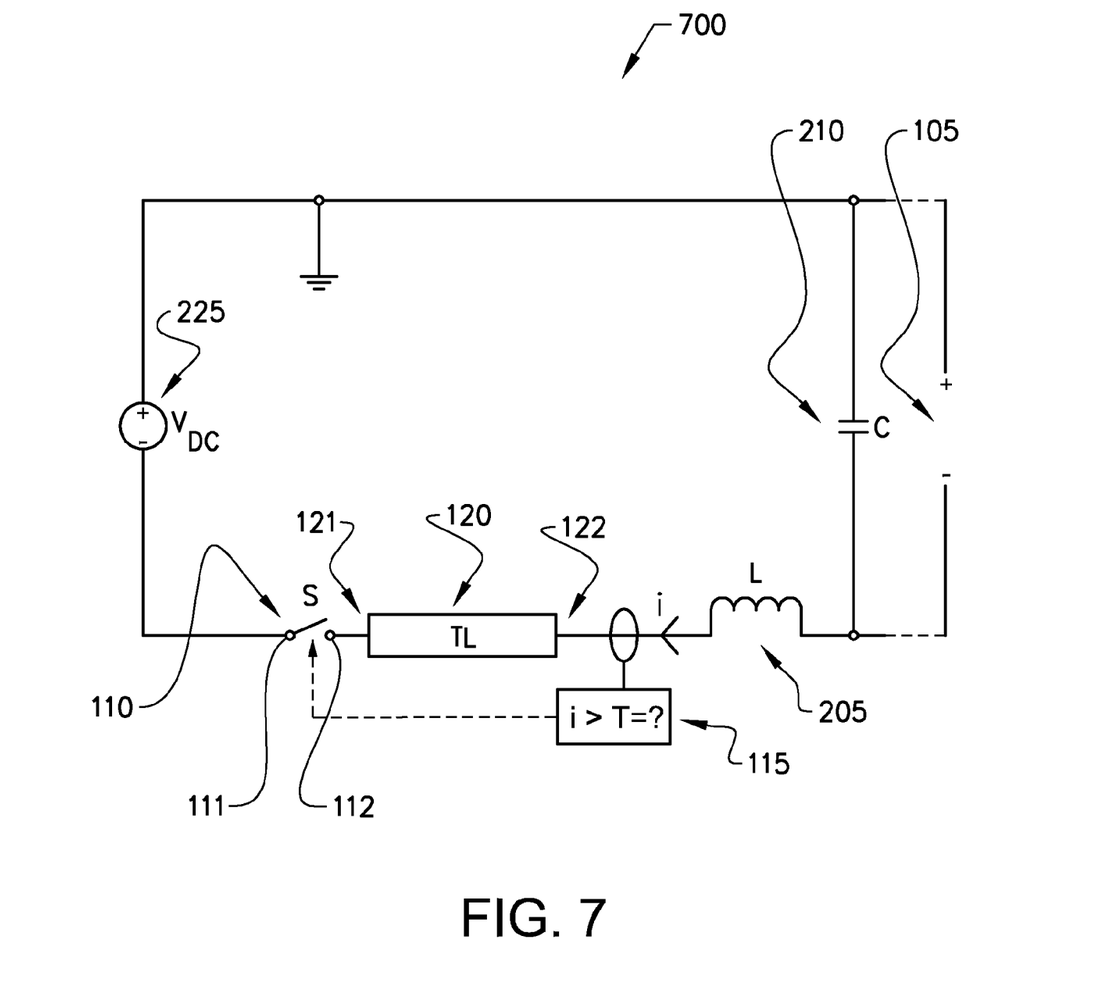
FIG. 7 shows a further embodiment of a current limiter.

FIG. 7 shows the embodiment of FIG. 5, here equipped with an inductor 205 in series with the transmission line 120. This embodiment is intended to show that although the transmission line 120 has inductive properties, if it is desired to obtain further inductive properties in series with the switch 110, a separate inductor 205 can be included in the embodiment 500 of FIG. 5.

Regarding the exact nature of the switch, there are many alternative components which can serve as the switch 110. In various embodiments, those components are chosen as a transistor, or as a micro-electromechanical system ("MEMS") switch or as a relay.

As for the exact nature of the transmission line 120, this can also be chosen from among a number of various kinds of components. Examples of such components are microstrip conductors, strip-line conductors, conducting track shapes on a Printed Circuit Board, a PCB, and co-planar waveguides, and lumped transmission lines which comprise at least one capacitor and one inductor.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A current limiter comprising:
   a first connection to a load;
   a second connection to a DC-voltage source;
   a switch with an input port and an output port, the switch arranged so that current from a connected load to a connected DC-voltage source passes through the switch;
   a control component arranged to measure said current and to control the switch to assume an open or a closed position, wherein the switch in the closed position will admit current from the load to the DC-voltage source, the control component arranged to control the switch to assume the open position if the current from the load is above a first threshold value; and
   a transmission line with a first end and a second end, wherein said first end is connected to the input port of the switch, and said second end is either left open or connected to make the transmission line connected in series with the switch, wherein the transmission line is adapted to dissipate a current or current wave by causing, when the switch is in the open position, the current or current wave to reflect back and forth across at least the transmission line and the load in the current limiter.

2. The current limiter of claim 1, in which the control component is arranged to control the switch to assume the closed position if the current is below a second threshold value.

3. The current limiter of claim 1, in which the control component is arranged to control the switch to assume the closed position after a certain period of time in the open position.

4. The current limiter of claim 1, in which the switch is controlled to the closed position by a manual reset signal.

5. The current limiter of claim 1, further comprising a capacitor connected in parallel to the first connection.

6. The current limiter of claim 1, further comprising an inductor in series with the switch, arranged between the transmission line and the first connection.

7. The current limiter of claim 1, in which the switch comprises a transistor.

8. The current limiter of claim 1, in which the switch comprises a relay.

9. The current limiter of claim 1, in which the switch comprises a micro-electromechanical system switch.

10. The current limiter of claim 1, in which the transmission line is a microstrip transmission line.

11. The current limiter of claim 1, in which the transmission line is a stripline transmission line.

12. The current limiter of claim 1, in which the transmission line comprises conducting track shapes on a Printed Circuit Board (PCB).

13. The current limiter of claim 1, in which the transmission line is a co-planar waveguide.

14. The current limiter of claim 1, in which the transmission line is a lumped transmission line which comprises at least one capacitor and one inductor.

* * * * *